Patented Jan. 18, 1927.

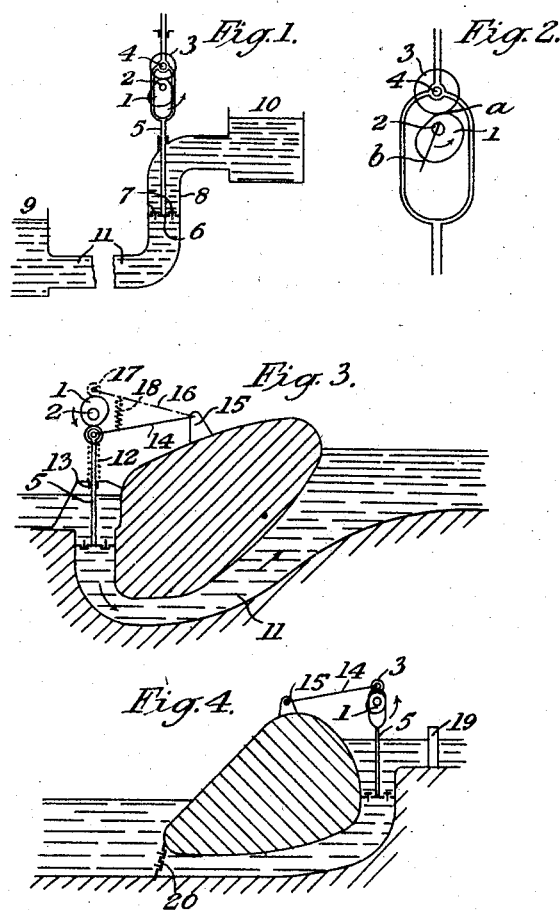

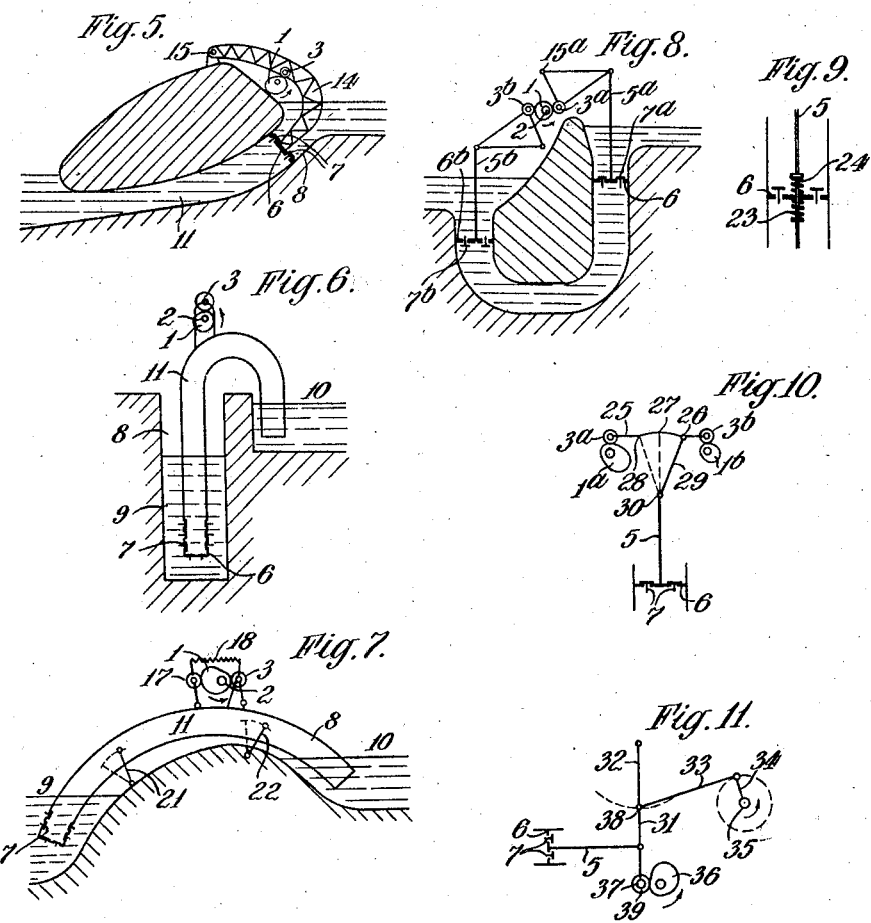

1,615,139

UNITED STATES PATENT OFFICE.

WILLIAM JOSEPH RUSDELL, OF WOLVERHAMPTON, ENGLAND.

METHOD OF PUMPING LIQUID AND APPARATUS THEREFOR.

Application filed January 10, 1923, Serial No. 611,817, and in Great Britain January 28, 1922.

This invention relates to an improved method of pumping liquids or the production of power from the energy of liquid under head or pressure.

Usually in pumps or liquid pressure motors employing rams, buckets or pistons (hereinafter referred to as pistons) which derive their motion from a rotating part, the liquid has to follow the approximately harmonic motion of the pistons and consequently during a pumping stroke excessive pressure has to be applied by the piston to accelerate the liquid which has no natural tendency to harmonic motion. During the return stroke of the piston the liquid is at rest, being prevented from returning by a valve or valves. A pump of this description is badly adapted to operate at high speeds, there being considerable liability to shock.

For purposes of describing the nature of the present invention it is only necessary to describe the action of a pump, since a motor may be taken to be a reversed pump, but in the case of a motor the valves for liquid are preferably mechanically operated.

When the invention is applied to a pump a column of liquid having considerable momentum is utilized and preferably, although not necessarily, this column moves continuously in one direction without reversing its direction of flow. A piston, during a considerable part of the strokes in one direction (the direction of flow), may exert substantially constant pressure against the liquid column, thus causing the latter to move with substantially constant acceleration. During the intervening periods the liquid column will be retarded, usually at constant rate, because of the head, pressure or resistance against which it is forced. Thus the liquid column will alternately gain velocity at substantially constant acceleration during the working strokes and lose velocity at substantially constant retardation during the intervening periods.

The periods during which the liquid column is accelerated may, if desired, occupy less or more than half the total time, the greater the time occupied, the less remaining for retardation of the column and consequently the liquid column may move more uniformly. A high speed of operation, that is a large number of strokes in a given time, may also tend to more uniform motion of the liquid column.

An apparatus for employing the method need not have more than one piston and one valve or set of valves, although, for purposes of starting or priming, a liquid retaining valve or set of valves may be used.

At the end of a pumping stroke the piston is moving with considerable velocity and this velocity is preferably reduced to zero and reversed for the return stroke at constant retardation (or acceleration in backward direction) until a desired return velocity is acquired when it may continue to move at this velocity for the requisite period for completion of the return stroke. Now the return velocity is reduced to zero and reversed for another pumping stroke preferably at constant retardation (or acceleration in the direction of flow) until the velocity of the piston is substantially equal to the velocity of the liquid column and now the acceleration is modified (if desired) to give the uniform pressure to the liquid column during the pumping stroke as already described.

One form of apparatus for carrying the invention into effect will now be described.

A piston is adapted to slide in a barrel and the liquid therein forms part of a liquid column having considerable momentum. The piston has non-return valves adapted to open in the direction of flow and has reciprocating motion imparted to it by a cam of appropriate shape and transmitted through suitable mechanism, so that the piston moves in the following manner:—

The liquid column is assumed to be moving in the direction of flow with decreasing velocity due to the head, pressure or resistance against which it is pumped. The piston is beginning its outstroke and, at a certain instant, acquires the velocity which the liquid column has at that instant, the valves in the piston closing substantially at this moment.

The cam is so formed that the piston now moves in the direction of flow with substantially uniform acceleration, thus exerting substantially constant pressure against the liquid column which will have the same motion as the piston. Towards the end of the outstroke the motion of the piston is retarded at uniform retardation so as first to come to rest, and then begins a return stroke in inward direction, the valves opening to permit the passage of liquid through the piston when the velocity of the piston falls below that of the column and continuing open during the return stroke.

The retardation (or acceleration in inward direction) is continued until the piston acquires sufficient velocity to complete its return stroke, this velocity being maintained for a requisite period so that, by imparting a definite acceleration in the direction of flow, the piston is first brought to rest and then acquires the velocity of flow of the liquid column, which it has when the valves close as already described. During the time the valves are open the piston is not exerting pressure on the liquid column which, however, continues to move by virtue of the momentum acquired but at gradually diminishing velocity dependent upon the length of the column and the head, pressure or resistance against which it is pumped.

In practice some slight modifications from the ideals of uniform acceleration, retardation or velocity may be desirable, such as a gradual change from the one to the other.

In many cases of pumping the head or pressure pumped against may change or from other causes the natural retardation of the liquid column may vary during those periods when it is not forced by the piston or it may be desired to operate the pump at different speeds to vary the quantity pumped. A single cam with the varying conditions may not give equally satisfactory results. By using two cams which may or may not be mounted on the same shaft and by connecting the piston with a part or parts which is or are operated simultaneously by both cams the motion of the piston may be governed partly by one cam and partly by the other cam, and it can be arranged that the piston motion shall be governed more or less by the respective cams to suit the prevailing conditions. For instance if the respective ends of a lever are operated by the two cams, intermediate points will move partly according to one cam and partly according to the other, according to the distances from the ends, and, by connecting the piston at varying distances from the ends, the object in view will be obtained.

In British Patent No. 160,120 is described how springs or elastic devices may be used to permit the piston to more readily follow the motion of a liquid column without shock and similar springs and devices may be used in combination or conjunction with the method of the present invention.

If the accelerations produced by the motion of the pistons is too great or too small or if the compression of the elastic devices is abnormal, the abnormal pressures or movement produced may be utilized to automatically cause the piston to be operated more by one cam and less by the other, so that the piston motion is more suitable to the prevailing conditions.

The valve or valves for liquid need not be situated in the piston but may be in a stationary part, preferably close to the piston, or some of the valves may be in the piston and some in a stationary part.

The piston may operate at either end of the column or intermediately and may operate the liquid column by pressure before it or by suction behind it or by both pressure and suction.

When the piston is at an end of the column both piston and valves may be very easy of access and the valve area for a given area of piston may be considerably increased conveniently, as for instance by extending the piston beyond the working barrel and column and forming the extension of more suitable shape and size to take the valves. Thus the working barrel may be circular and the extended part rectangular or vice versa.

The return stroke of the piston may be caused by gravity, springs or elastic devices, and may follow the profile of the main cam or be forced by, or follow the profile of, another cam or by a suitable combination.

Instead of a piston sliding in a working barrel flexible diaphragms or inflated pneumatic tubes may be used as described in British Patent No. 160,120.

Two or more pistons governed by the same cam or separate cams may be used to act as the same liquid column to give more uniform motion.

The invention is illustrated in the accompanying diagrams of pumps or parts of pumps, shown in Figures 1 to 11 of the drawings.

Fig. 1 shows a piston 6 adapted to slide in a barrel 8 in which the liquid forms part of a column 11 having considerable momentum and is to be raised from a low level tank 9 to a tank 10 at higher level. The piston has non-return valves 7 adapted to open in the direction of flow and has reciprocating motion imparted to it by a cam 1 carried by the driven shaft 2 and engaging a roller 3 pivoted at 4 in the bow of the pump rod 5.

The cam is shown drawn to an enlarged scale in Fig. 2; its shape may vary somewhat to suit different purposes but may suitably be such as will produce the following result:—The direction of rotation being that indicated by the arrow, as the cam turns from the position in which point $a$ on its periphery is in contact with the roller 3 until the point $b$ is in such contact, the piston is caused to move upwards with gradually increasing velocity, preferably at constant acceleration; the upward velocity is then reduced to zero and reversed so that the piston descends again under action of gravity, a spring or a second cam or the like, the roller remaining in contact with the cam. The negative acceleration producing this change of velocity is preferably constant and continues until the velocity is attained which is requisite to complete the return stroke. The direction of motion is now again reversed, preferably at constant acceleration, until, when the contact is again at point $a$, the piston is moving upwards at increasing velocity, as already stated.

The movement of the liquid column 11 in relation to the movement of the piston will be as follows:—

Assuming that the column is moving at a certain decreasing velocity from tank 9 to tank 10 and that when the cam is in the position shown in Fig. 2, the velocity of the piston, which is increasing, has become or will shortly become equal to that of the column, the valves 7 close and the piston gradually accelerates the motion of the column until the contact of cam and roller is at point $b$, whereafter the piston comes to rest and returns. If the length of the liquid column is suitably chosen with respect to the difference in head, it can be arranged that the column is still moving towards tank 10 when the piston moves upwards again and that the velocities of piston and liquid are again equal at the same point of the cycle as before. Valves 7 will then be open from the time that point $b$ leaves the roller until the said point of the cycle.

If the head against which the liquid is being pumped increases, causing a greater retardation of the liquid column the valves will close earlier during the upstroke, or it may be even during the downstroke, but to enable the valves to close on their seats as quietly as possible, the acceleration of the piston in forward direction should be as low as possible with respect to the liquid column at the moment when the velocities of piston and column become the same.

It is, therefore, preferable that the valves should close after point $a$ has come into contact with the roller because the profile of the cam is shaped there for that purpose.

Variation of the speed of pumping by varying the speed of the cam will have an effect on the closing of the valves similar to that which variation of the head has; reducing the speed, like increasing the head, will cause the valves to close earlier in the movement of the cam, while increasing the speed, like reducing the head, will cause them to close later in the movement of the cam.

In Fig. 3 the piston 6 is at the low level end of the liquid column 11. The piston rod 5 slides in a guide 13 and its roller 3 is kept against the cam 1 by a spring 12. Instead of the guide 13, roller 3 may be carried on a radius arm 14 pivoted at 15 and instead of spring 12, a second radius arm 16 carrying roller 17 may be connected with the first by a spring 18. In order to reduce loss of head due to velocity, the pipe containing column 11 may be of gradually contracting and then expanding section, as indicated.

In Fig. 4 the piston being at the delivery end of the column the latter is raised under suction, not by direct pressure, so that this form is suitable only for low heads. The arrangement presents the advantage that the piston can be pulled directly out of the barrel for inspection and repair. To prevent return of liquid when the apparatus is at rest a gate 19 may be provided, or foot valves 20. The latter may also be desirable for priming the pump for starting.

In Fig. 5 the piston is integral with the radius arm 14 carrying the roller 3 and pivoted at 15. The barrel 8 is so formed that the radius arm may oscillate about the pivot 15, but notwithstanding the inclined form of the barrel the effect of pivot 15 will be to prevent the weight of the piston from causing friction between the piston and the barrel. The return stroke of the piston may be caused by gravity, springs or another cam or by a combination of these. The piston is very readily removed for repair or inspection.

Fig. 6 shows the application of the invention to a pump having a reciprocating barrel. The column 11 is enclosed in the barrel 8 which is closed at one end (in this case the lower end) where the valves 7 are placed. The roller 3 is mounted on the barrel 8 and suitable guides (not indicated) are provided. The closed end performs the function of a piston and where the difference of head is small the delivery end of the barrel may be the closed end. In the former case the action is similar to that described with reference to Fig. 1 and in the latter to that described with reference to Fig. 4.

In Fig. 7 the reciprocating barrel 8 is curved and oscillates on pivoted arms 21, 22. The action of the cam 1 on roller 3 carried by the barrel, determines this oscillation.

Where there is a considerable difference of head or it is desired to operate the apparatus comparatively slowly, two pistons acting successively in series, on the same column of liquid, may be used. Fig. 8 shows for example what may be called a combination of Figs. 3 and 4. Obviously, the pistons $6^a$ and $6^b$ having valves $7^a$, $7^b$, may be operated by separate cams, but there is here shown a single cam 1 which engages a roller $3^a$ carried by an arm pivoted at $15^a$ and connected with piston rod $5^a$, and a roller $3^b$ carried by an arm pivoted at $15^b$ and connected with piston rod $5^b$.

If, through any cause, a valve should fail to close at the moment when the velocities of piston and column are equal, there may be a tendency to shock due to the piston moving faster than the column. This shock may be eliminated or reduced by interposing springs or other elastic devices between the piston, or that portion of it which is in contact with the liquid, and the mechanism which is under the direct influence of the driving power, as described in British Patent No. 160,120.

In Fig. 9 such a device in the form of a spring 23 is shown, the piston 6 being adapted to slide on the rod 5 in order that spring 23 may be compressed. A spring 24 is added to take up any recoil due to the action of spring 23.

One manner of modifying the acceleration imparted by the piston to the liquid column to suit a change of head or a varied speed of operation, is illustrated in Fig. 10. The two cams 1$^a$ and 1$^b$ engage, respectively, rollers 3$^a$ and 3$^b$ joined by a lever 25. The pump rod 5 is suitably guided and is pivoted at 30 to a link 29 by which it may be connected at one of several points 26, 27, 28 on the lever 25; for instance, if connected at 26 the piston will be more affected by cam 1$^b$ than by cam 1$^a$; if connected at 28 it will be more affected by cam 1$^a$ than by cam 1$^b$. The cams are so formed that one gives large acceleration and the other small.

Instead of obtaining the motion of the piston purely by a cam, a common form of motion may be modified by a cam. Thus in Fig. 11, crank 34 rotating about axis 35 is connected with radius arm 32 by rod 33 pivoted at 38 and thus causes the end of lever 31 to oscillate with motion more or less harmonic. The end 37 of lever 31 carries a roller 39 engaged by cam 36. By suitably forming this cam, directly connected with or geared to crank 34, it can be arranged that piston 6, operated by lever 31 through link 5, may have motion similar to that of piston 6 in Fig. 1; but the cam acts merely as a compensating device, the major part of the work being performed by the crank 34 and connecting rod 33.

Having thus described the nature of the said invention and the best means I know of carrying the same into practical effect, I claim:—

1. A method of pumping liquids consisting in imparting successive impulses to a column of liquid moving with momentum and causing said column to alternately gain velocity at substantially constant acceleration during said impulses and to lose velocity at substantially constant retardation between such impulses.

2. A method of operating a pump for liquids involving a column of liquid having considerable momentum, which consists in causing a reciprocating means to intermittently act upon a column of liquid and during a considerable part of its strokes in the direction of flow to exert substantially constant pressure against the liquid column, so as to cause the latter to move with substantially constant acceleration.

3. A method of pumping liquids consisting in imparting successive impulses to a column of liquid moving with momentum and causing said column to gain velocity at a substantially constant acceleration during more than half the duration of each impulse and to lose velocity at substantially constant retardation between such impulses.

4. A method of operating a pump for liquids involving a column of liquid having considerable momentum which consists in causing a reciprocating element to intermittently act upon such column and, during more than half the total time of each complete cycle of operation of said element in the direction of flow, to exert substantially constant pressure against the liquid column, so as to cause the latter to move with substantially constant acceleration.

5. A method of operating a pump for liquids involving a column of liquid having considerable momentum, which consists in causing a reciprocating piston to be moved under action of a cam or equivalent device so that at the end of a pumping stroke, the piston is moving with considerable velocity which is reduced to zero and reversed for the return stroke at substantially constant retardation until a desired return velocity is acquired whereafter this velocity is reduced to zero, reversed and then the piston is caused to acquire substantially constant acceleration at or about the moment when its velocity equals that of the liquid column, substantially as described.

6. A pump for liquids or a motor operated by liquid under pressure comprising a reciprocating piston and a rotating cam for actuating said piston, said cam having a periphery of such profile that the piston, during the working portion of a stroke, acquires substantially constant acceleration.

7. A pump for liquids or a motor operated by liquid under pressure, comprising a reciprocating piston and a rotating cam for actuating said piston, said cam having a periphery of such profile as to cause the piston at the end of a pumping stroke to move with considerable velocity, then to reduce such velocity to zero and then to reverse the movement of said piston for the return stroke at substantially constant retardation until a desired return velocity is acquired, and then to reduce such velocity to zero, then to reverse such velocity and to cause substantially constant acceleration to be imparted to the liquid column when the falling velocity of the latter equals that of the piston.

8. A pump for liquids comprising a reciprocating piston, a radius arm connecting the said piston with a fixed point so as to guide the piston and a cam controlling the movement of the piston, the periphery of the said cam being of such profile that the piston during the working portion of the stroke acquires substantially constant acceleration.

9. A pump for liquids comprising a piston, a radius arm carrying the said piston and a cam controlling the movements of the said radius arm, the periphery of the said cam being of such profile that the radius arm and therefore the piston during the working portion of the stroke acquires substantially constant acceleration.

10. A pump as referred to in claim 6 wherein the piston is the closed end of a pipe which is given a reciprocating movement under the influence of the cam so that the liquid column is contained in the pipe and travels through it.

11. A pump for liquids comprising a reciprocating piston, a rotating cam for actuating said piston, said cam having a periphery of such profile that the piston, during the working portion of its stroke acquires substantially constant acceleration, and means associated with said cam and said piston for modifying the rate of acceleration imparted by said cam to said piston.

12. A pump according to claim 6 wherein the piston is controlled by two cams of different dimensions, substantially as and for the purpose set forth.

In testimony whereof I have signed my name to this specification.

WILLIAM JOSEPH RUSDELL.